US009831783B2

(12) United States Patent
Coteus et al.

(10) Patent No.: US 9,831,783 B2
(45) Date of Patent: Nov. 28, 2017

(54) POWER CONVERTER USING NEAR-LOAD OUTPUT CAPACITANCE, DIRECT INDUCTOR CONTACT, AND/OR REMOTE CURRENT SENSE

(71) Applicant: International Business Machines Corporation, Armonk, NY (US)

(72) Inventors: Paul W Coteus, Yorktown, NY (US); Andrew Ferencz, Southborough, MA (US); Shawn A Hall, Pleasantville, NY (US); Todd E Takken, Brewster, NY (US); Shurong Tian, Mount Kisco, NY (US); Xin Zhang, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 45 days.

(21) Appl. No.: 14/983,700

(22) Filed: Dec. 30, 2015

(65) Prior Publication Data

US 2017/0194871 A1 Jul. 6, 2017

(51) Int. Cl.
*H05K 1/11* (2006.01)
*H02M 3/335* (2006.01)
*H02M 1/00* (2006.01)

(52) U.S. Cl.
CPC .......... *H02M 3/33546* (2013.01); *H02M 2001/0009* (2013.01)

(58) Field of Classification Search
CPC ........ H05K 1/11; H05K 1/16; H05K 2201/10; H05K 2201/1003; G05F 1/462; G05F 1/56; G05F 3/156; G05F 3/158
(Continued)

(56) References Cited

U.S. PATENT DOCUMENTS 6,731,512 B2 * 5/2004 Nebrigic ................. H01L 23/04
257/E23.181
6,785,147 B2 * 8/2004 Miki ....................... H01G 9/15
257/E23.079
(Continued)

FOREIGN PATENT DOCUMENTS

CN 103825479 A 5/2014
JP 2012099512 A 5/2012
(Continued)

OTHER PUBLICATIONS

"Voltage converter circuitry for optimal power efficiency" IBM IPCOM000181515D, Apr. 3, 2009.
(Continued)

*Primary Examiner* — Adolf Berhane
(74) *Attorney, Agent, or Firm* — Harrington & Smith

(57) ABSTRACT

An apparatus includes a first circuit board including first components including a load, and a second circuit board including second components including switching power devices and an output inductor. Ground and output voltage contacts between the circuit boards are made through soldered or connectorized interfaces. Certain components on the first circuit board and certain components, including the output inductor, on the second circuit board act as a DC-DC voltage converter for the load. An output capacitance for the conversion is on the first circuit board with no board-to-board interface between the output capacitance and the load. The inductance of the board-to-board interface functions as part of the output inductor's inductance and not as a parasitic inductance. Sense components for sensing current through the output inductor are located on the first circuit board. Parasitic inductance of the board-to-board interface has less effect on a sense signal provided to a controller.

22 Claims, 8 Drawing Sheets

(58) Field of Classification Search
USPC ........ 361/721, 760, 761, 763; 323/265, 273, 323/282, 351
See application file for complete search history.

(56) References Cited

U.S. PATENT DOCUMENTS

| | | | | |
|---|---|---|---|---|
| 7,319,599 | B2* | 1/2008 | Hirano | H01G 4/40 174/259 |
| 7,838,902 | B2 | 11/2010 | Tai et al. | |
| 7,839,649 | B2* | 11/2010 | Hsu | H01L 23/5389 174/262 |
| 8,344,842 | B1* | 1/2013 | Luzanov | H05K 1/141 336/192 |
| 8,461,463 | B2* | 6/2013 | Kato | H01L 23/49822 174/258 |
| 8,587,956 | B2* | 11/2013 | Choutov | H05B 33/0803 361/674 |
| 2007/0015416 | A1* | 1/2007 | Gutierrez | H01R 24/64 439/676 |
| 2007/0091659 | A1* | 4/2007 | Lin | H05K 1/141 363/127 |
| 2007/0093165 | A1* | 4/2007 | Komatsu | H01F 27/326 445/23 |
| 2008/0139013 | A1* | 6/2008 | Tomura | H05K 3/368 439/65 |
| 2009/0002974 | A1 | 1/2009 | Yahata et al. | |
| 2009/0175014 | A1* | 7/2009 | Zeng | H05K 1/141 361/782 |
| 2013/0062730 | A1 | 3/2013 | Palumbo et al. | |
| 2014/0061884 | A1 | 3/2014 | Carpenter et al. | |
| 2014/0063744 | A1 | 3/2014 | Lopez et al. | |
| 2014/0183550 | A1 | 7/2014 | Reusch et al. | |
| 2014/0247562 | A1 | 9/2014 | Herbsommer et al. | |
| 2015/0216054 | A1* | 7/2015 | Standing | B23K 1/0016 361/761 |

FOREIGN PATENT DOCUMENTS

| | | |
|---|---|---|
| JP | 2012114164 A | 6/2012 |
| JP | 2013141035 A | 7/2013 |

OTHER PUBLICATIONS

"Switching Loss Analysis Considering Parasitic Loop Inductance With Current Source Drivers for Buck Converters" Zhiliang Zhang; Fu, Jizhen; Yan-Fei Liu; Sen, P.C. Power Electronics, IEEE Transactions on vol. 26, Issue: 7, Publication Year: 2011, pp. 1815-1819 DOI: 10.1109/TPEL.2010.2096476.

"Parasitic inductance effect on switching losses for a high frequency Dc-Dc converter" Meade, T.; O'Sullivan, D.; Foley, R.; Achimescu, C.; Egan, M.G.; McCloskey, P. Applied Power Electronics Conference and Exposition, 2008. APEC 2008. Twenty-Third Annual IEEE; Publication Year: 2008, pp. 3-9 DOI: 10.1109/APEC.2008. 4522692.

https://en.wikipedia.org/wiki/Buck_converter, Buck converter, from Wikipedia, the free encyclopedia, 15 pages, downloaded Nov. 3, 2015.

* cited by examiner

POWER CONVERTER USING NEAR-LOAD OUTPUT CAPACITANCE, DIRECT INDUCTOR CONTACT, AND/OR REMOTE CURRENT SENSE

GOVERNMENT RIGHTS

This invention was made with Government support under Contract No.: B604142 awarded by Department of Energy. The Government has certain rights in this invention.

BACKGROUND

The present invention relates to power converters, and more particularly to power converters using near-load output capacitance, direct inductor contact, and/or remote current sense.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, after the detailed description section.

Modern electronics depend enormously on compact and efficient power converters. These so-called DC-DC (direct current to direct current) devices typically convert a higher voltage (for example 12V for a computer running from AC power using a 12V output power supply) to a lower voltage (for example 0.8V for a modern microprocessor). These DC-DC converters, also called DC-DC regulators, are manufactured and sold by a wide number of companies. They are used in cars, cellphones, computers, and are part of nearly every electronic device. With today's emphasis on low power consumption, these power converters are themselves being redesigned for improved conversion efficiency, or the ratio of the product of the output voltage and output current, to the product of the input voltage and input current. See the following equation, for instance:

DC-DC efficiency=$(V_{out}*I_{out})/(V_{in}*I_{in})$, where $V_{out}$ and $I_{out}$ are output voltage and current, respectively, of a DC-DC converter, and $V_{in}$ and $I_{in}$ are input voltage and current, respectively, of the DC-DC converter.

Modern power converters are now over 90% (percent) efficient. Even with this high level of efficiency, these can be improved.

SUMMARY

This section is intended to include examples and is not intended to be limiting.

An exemplary embodiment is an apparatus, comprising first and second circuit boards. The first circuit board comprises first components comprising a load. A power block comprises the second circuit board electrically connected to the first circuit board and comprising second components comprising switching power devices and an output inductor. The second circuit board is configured such that ground and output voltage contacts between the first and second circuit boards are made through soldered or connectorized board-to-board interfaces. Certain first components on the first circuit board and certain second components, including the output inductor, on the second circuit board operate as a voltage converter that performs DC-DC voltage conversion for at least the load. An output capacitance for the voltage converter is located on the first circuit board with no board-to-board output voltage interface between the voltage converter output capacitance and the load, thereby causing the inductance of the board-to-board output voltage interface to function as part of the voltage converter output inductor's inductance and not as a parasitic inductance between the voltage converter output capacitor and the load.

In another exemplary embodiment, a first terminal of the output inductor contacts the first circuit board and a second terminal of the output inductor contacts the second circuit board, thereby connecting the output inductor to the first circuit board through a path separate from a board-to-board interface used by the ground and other electrical signals comprising control and input voltage, thereby removing the electrical resistance of the board-to-board connection from a power line that is an output of the inductor and reducing cost and mechanical bulk of the board-to-board interface.

In a further exemplary embodiment, components used for sensing the current produced through or voltage produced across the output inductor are on the first circuit board near the load and not on the second circuit board, and no second components are used for sensing the current through or voltage across the output inductor, thereby reducing the current through a sense line from these sense components and a measurement circuit on the first circuit board, thereby reducing the electrical effect of this sense line's parasitic inductive connection between the second and the first circuit boards.

In another exemplary embodiment, the apparatus of the two previous paragraphs may be combined.

Each of FIGS. 4-7 is a schematic of an exemplary power block packaging concept.

Figure 8:
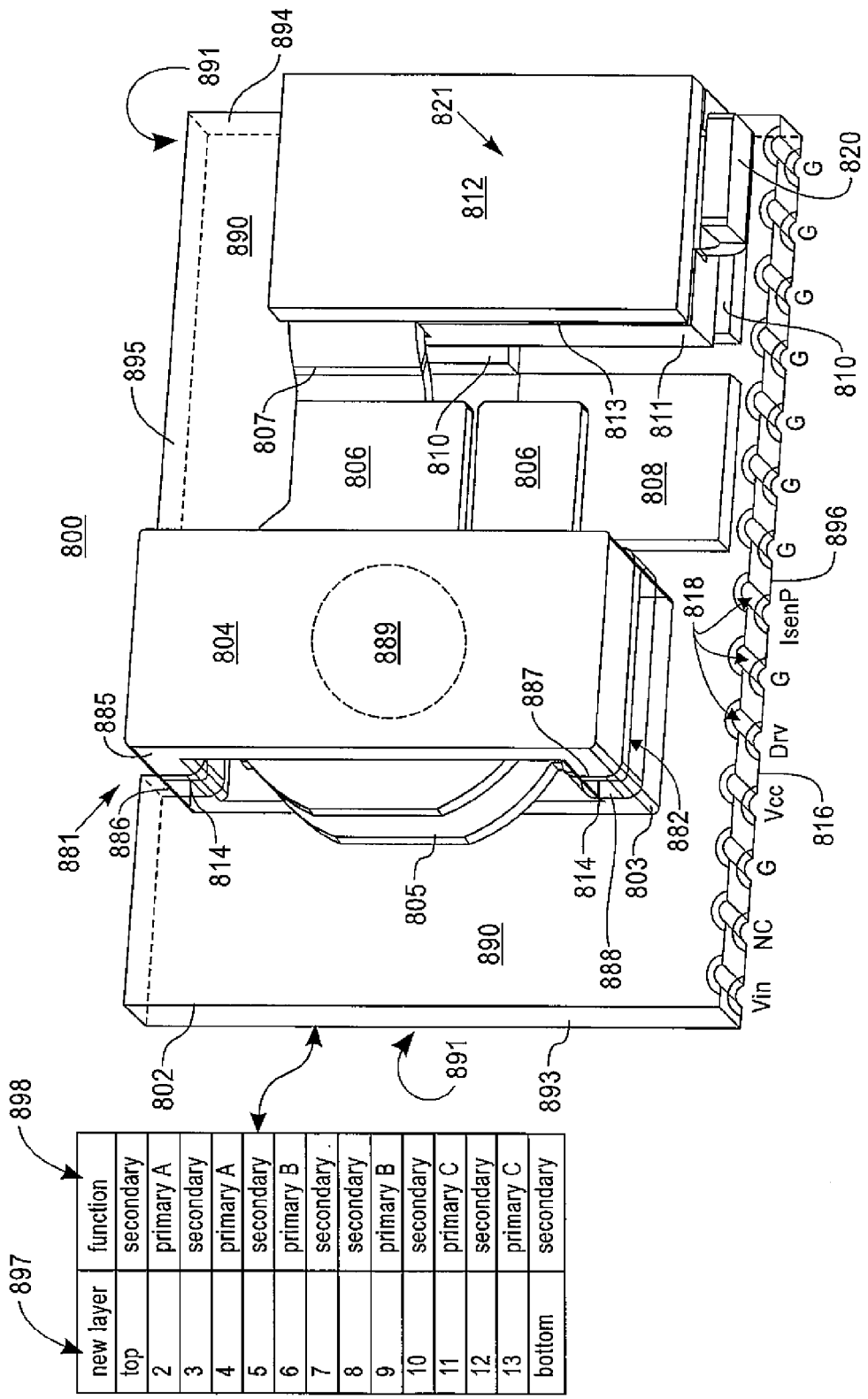

FIG. 8 is an exemplary physical example of the power block packaging concept.

Figure 9A:
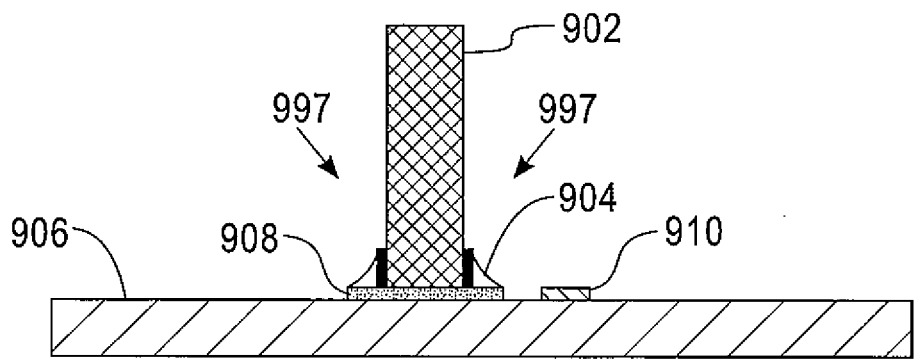
Figure 9B:
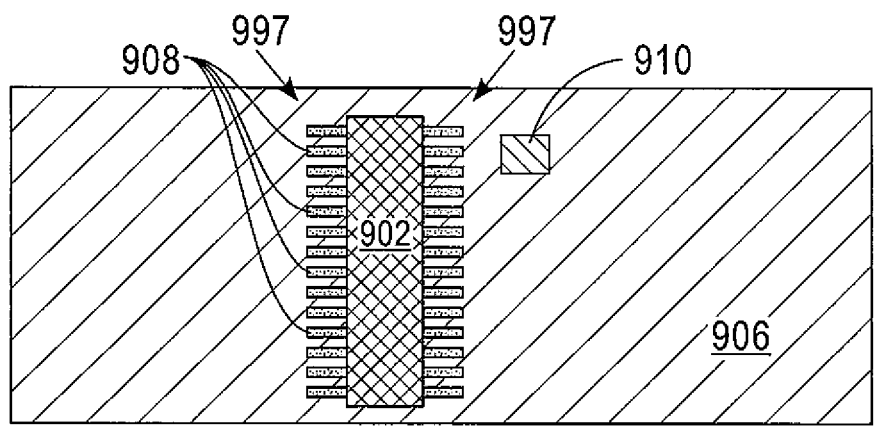

FIGS. 9A and 9B are collectively referred to herein as FIG. 9; FIG. 9A is a side view, and FIG. 9B is a top view of power block surface features.

Figure 10:
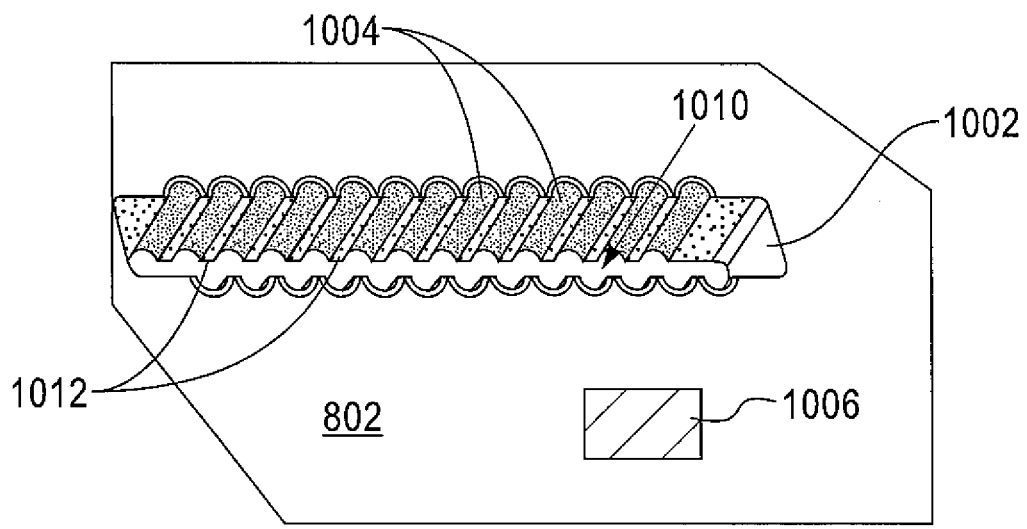

FIG. 10 illustrates the footprint/pads of the power block on the mother board in an exemplary embodiment.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As stated above, although modern power converters are now over 90% (percent) efficient, these can be improved.

Additional description of power converters is provided, and then more detailed description follows.

Figure 1:
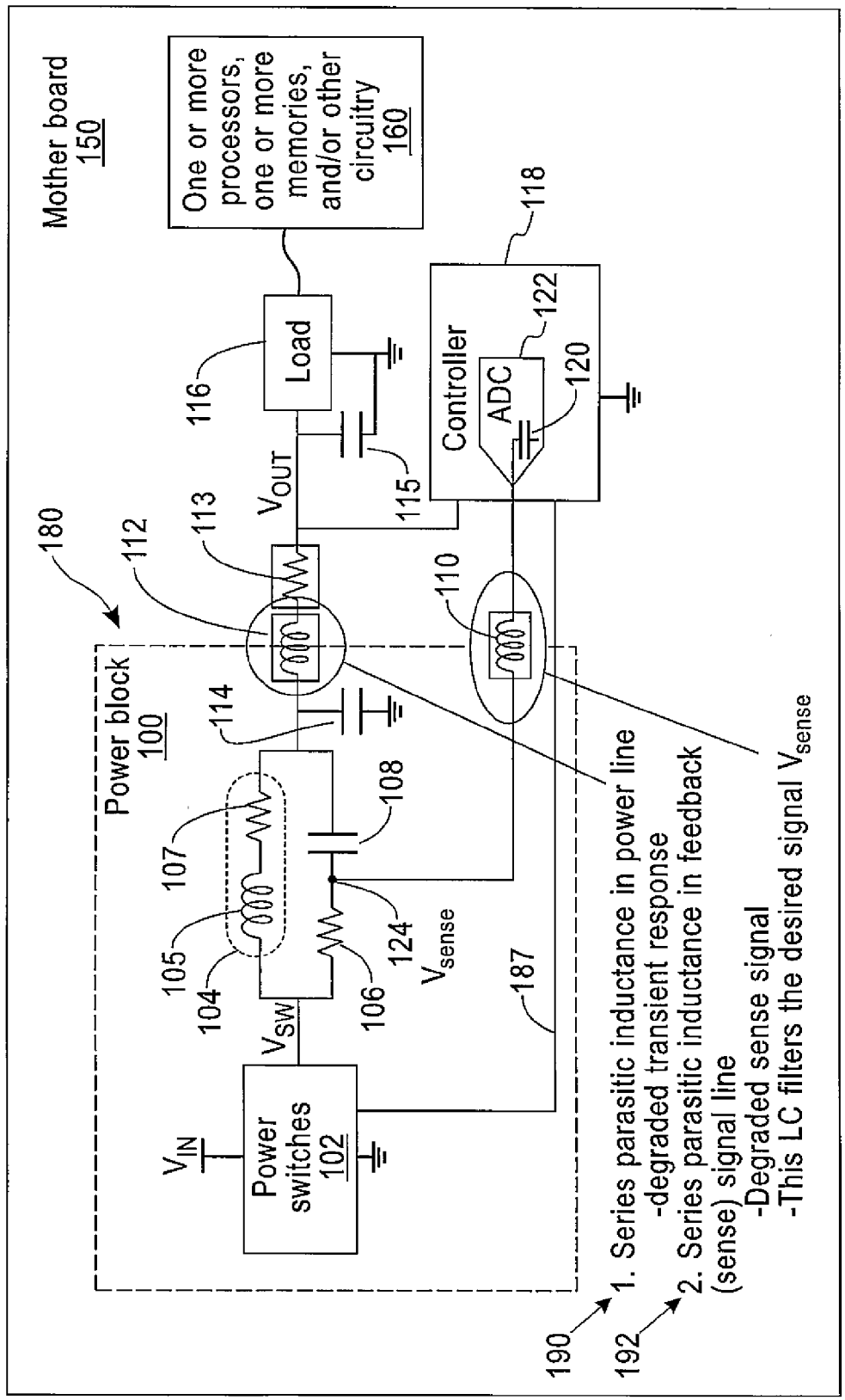
FIG. 1 illustrates a conventional DC-DC converter with load and controller.
Figure 2:
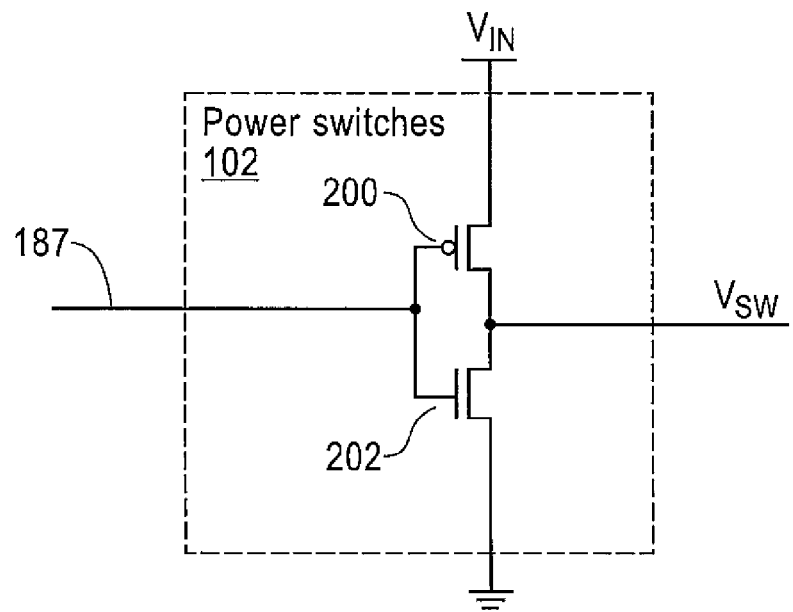
FIG. 2 illustrates a simple power switch for a buck converter.

In terms of DC-DC converters previously discussed, a very popular design is the synchronous buck converter, where a simple power switch as shown in FIG. 2 made of high current Field Effect Transistors (FETs) creates a changing current (dI/dt), which when sent through an inductor L, creates a variable voltage L*dI/dt, where dI is the value of the current change in time interval dt. The power switch inverter which creates the changing current is shown in FIG. 2 (called power switches in FIGS. 1 and 2), while the full DC-DC converter is shown in FIG. 1, including the inductor, the load, and the sense circuit for regulating the output voltage. FIG. 1 shows a power block 100 (e.g., an external part of a power supply) comprising power switches 102 connected to $V_{in}$ and ground and producing $V_{SW}$, and $V_{SW}$ is split into a branch containing an inductor 104 (diagrammed schematically as having an inductance 105 and equivalent series resistance 107) and a branch comprising resistor 106 and capacitor 108. The power block also includes a capacitor 114. A voltage converter 180, which performs DC-DC conversion, comprises power switches 102, inductor 104, resistor 106, and capacitors 108 and 114. The mother board 150 includes load 116, capacitor 115, and a controller 118. The load 116 may include (see reference 160) one or more of processors, one or more memories, and/or other circuitry. The load 116 and the reference 160 are meant to illustrate many possible different configurations for loads. The controller 118 produces a signal (or multiple signals) 187 to control the power switches 102. The power block 100 produces an output voltage $V_{out}$ and also has a voltage that can be sensed (at location 124 and referred to as $V_{sense}$). The controller 118 includes an ADC 122 in this example. However, the ADC 122 is only one possibility and may not be included, and the controller 118 may include other circuits (not shown) such as an amplifier. The series parasitic inductor 112 in the power line causes a degraded transient response, as illustrated by reference 190. The series parasitic inductor 110 in the feedback (e.g., sense) signal line causes a degraded sense signal and the combination of the series parasitic inductor 110 and the parasitic capacitor 120 creates an LC filter that degrades the desired signal Vsense (which is used as an output inductor current sense, although it could be used as an output voltage sense), and limits the controller from accurately modifying the power supply output. See reference 192. FIG. 2 shows one example of power switches 102, where the power switch 200 is a PFET and the power switch 202 is an NFET. These FETs are controlled by a single (in this example) signal 187.

Buck converters, which are now used to externally power many of the latest processors, can have efficiency as high as 92%, and this typically occurs at 20 A or roughly one-half of full output current. Recent power conversion efficiency improvements have come from lower on-resistance power FETs with integrated FET gate drive, lower loss and higher field magnetic materials for inductors, and sophisticated controllers. Such buck converters can also have transformers in front of them, as shown in the feed-forward converter of FIG. 3. This is another example of the power switches 102 of FIG. 1, where the transformer 300 allows a transformation from even higher voltages, for example 48V or 350V, both of which have been used in past or current computers. The power switches 102 also include a capacitor 302, and four FETs 304 (PFET), 306 (NFET), 308 (NFET), and 310 (NFET).

Such DC-DC converters as shown in FIG. 1 can also be operated in parallel, usually with the phase of the switching frequency of each converter shifted by 1/N from its neighbor, where N is the number of converters in parallel. Thus for example with N=4, a common load could be supplied with up to 160 A by combining four buck converters in parallel, each supplying 40A. The four converters would all be operating at the same frequency, but shifted in phase by 90 degrees from each other.

Figure 3:
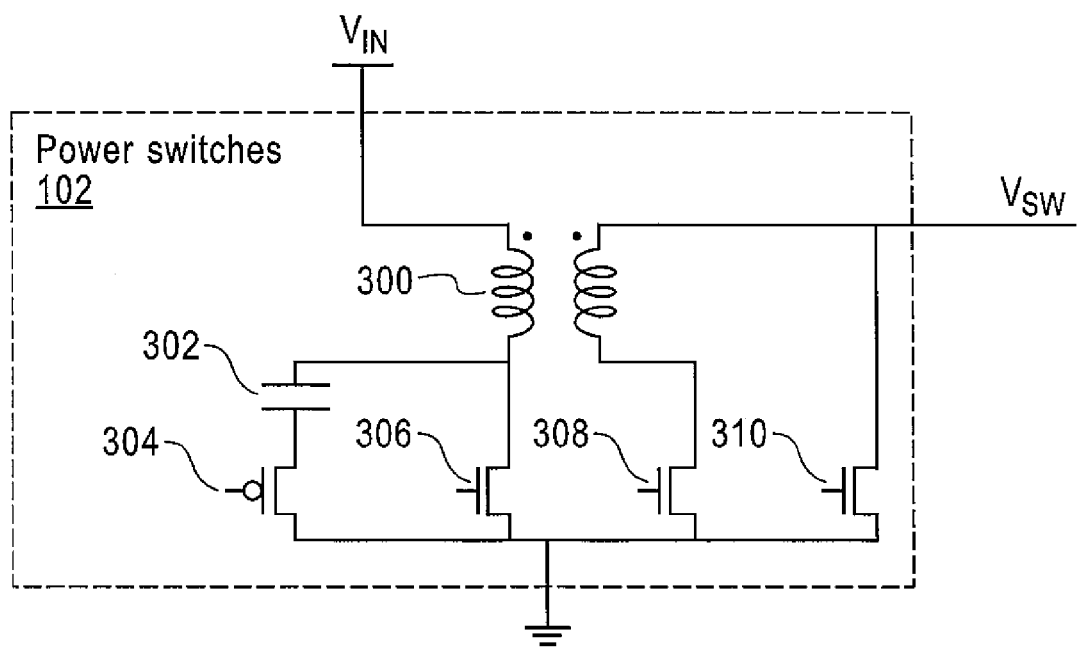
FIG. 3 illustrates a simple DC-DC power switch with transformer, referred to as a feed forward converter.

There are several limitations to modern power converters, which can be understood by reference to FIGS. 1-3. First, power converters, like any other electronic component, can fail in a variety of ways. To reduce their fail rate, they are typically built into small circuit cards and individually tested before being placed onto the larger electronic assemblies alongside the devices they are powering.

In FIG. 1, the dotted box represents the DC-DC converter circuit card, which is then connected to the system planar (the mother board 150 in this example) with the load 116 to be powered through a connection characterized by an inductance 112. This inductance 112 is parasitic, that is, not required for the converter to operate. Inductor 104 is required for the circuit to operate, and the inductor comes associated with an equivalent series resistance 107 as well. The $L*di/dt=V_{out}$ which occurs across this inductor is stabilized to a DC value by output capacitor 114, also located on the power converter card. Additional output capacitance represented by 115 is often required near the load (e.g., adjacent to the load), to further stabilize the voltage to perturbations resulting from the parasitic inductance 112. Note that although just a single inductance is shown, in actuality there is a separate inductance for the voltage and ground (or return), thus 112 can be thought of as the sum of these inductances.

The DC-DC converter test can be very simple such as testing for open or short circuits, or can be a complete functional test, or can even be an extended duration stress test at extreme conditions of load current and temperature, which is a process known as burn-in. Through these tests some number of converters will fail, and those that pass will be commensurately less likely to fail in the field as part of the larger assembly. However, placing such components on small cards is another level of integration, which can take valuable component space. Indeed, there is active research in developing a monolithic buck converter, entirely on one piece of silicon, which can be discretely tested and then placed. However, recent literature indicates that these will be restricted to relatively low currents, on the order of 5 A or less. Thus most recently, some device manufacturers have taken to assembling the components of DC-DC converters directly to the system planar containing the processors and memory systems they power. This results in cost saving, and moves the source of the power closer to where the power is consumed and thus limits the resistive loss, $I^2*R$, where I is the converter output current and R is the resistance of the conductor connecting the converter output to the load input. This loss occurs on both the voltage rail ($V_{out}$) as well as the ground return rail. The inductance 112 is also reduced, but not eliminated as the power supply cannot be directly atop the load. However, the individual power supplies cannot be tested or burned-in, as this would require the multiple devices providing the large required currents to be individually and serially powered on and tested, while the load, which is a complex device desiring a steady voltage, cannot be run from an individual power supply, nor should it be subjected, along with the whole of the system planar, do the extreme conditions of burn-in. Thus integrated multiple common power supplies and increased fail rates go hand in hand.

A second limitation is the inductance 112 between power converter and the load, which causes a voltage drop V=L*di/dt, where di is the current change during the time interval dt. The voltage is negative, that is it reduces the voltage supplied to the load, if the current changes from the low current to a high current. Thus for example many power supplies utilize a load line, or a means to have the supplied voltage be higher at the load when supplying low currents, than when supplying high currents. Such a load line can help mitigate the effects of the negative voltage transient induced by the supply output parasitic inductance, and has the desirable effect that the overvoltage (which also results in more power being dissipated by the load) occurs when the load is drawing relatively less current. Still, load lines cause other complications, and in any event cannot be easily made large enough to prevent the considerable, at least 70 mV, transients observed in current generation computer systems.

A third limitation is parasitic inductance 110 in the sense line (see 110 of FIG. 1). The converters are typically controlled by a controller (e.g., controller 118), which execute a command sequence which typically operates as a sequence of sample, compare, and command operations, which is repeated over and over again in loop fashion. There may be actually two control loops, and only one, the fast loop (also called the inner loop), is shown. This inner loop comprises the resistor 106 and the capacitor 108 and provides a sense signal $V_{sense}$ 124 to the controller 118. If many DC-DC converters in parallel are to deliver equal currents at the same common voltage, then a common controller 118 should sense each load current, as well as sample the voltage of each converter. To accomplish this, the sense signal 124 ($V_{sense}$) is digitized by an analog to digital converter (ADC) 122, and compared to the $V_{sense}$ of the other converters, as well as to the desired voltage (the set-point). In FIG. 1, resistance R 106 is many kilo-Ohms so that the current through R is small. The capacitance C 108 is chosen so the time constant RC is smaller than the switching period, so that the voltage $V_{sense}$ is proportional to the inductor 104 current of this particular converter. These are small currents, well under 1 milli-amp, so as to minimize converter losses.

However, the presence of L 110 disturbs the $V_{sense}$ signal, through the additional voltage L*dI/dt where dI is the change in sensed current in the time interval dt. The voltage adds to $V_{sense}$. In principle, L 110 could be calibrated out as it is not changing in time, but doing so would require precision trim circuits and adjustments made to each converter after assembly onto the system planar, which is both costly and time consuming.

It is also noted that variations in supplied voltage may be addressed. For instance, if the supplied voltage is too high, then for example FET 200 could be off a greater fraction of the time, and FET 202 conducting for a proportionally lesser time, which reduces $V_{out}$. This technique is called reducing the duty cycle, or the time that $V_{in}$ is supplying current to the load. The setting and possible changing of the set-point voltage itself is the responsibility of a second, slower control loop and will not be discussed herein.

The gate voltages of devices 304, 306, 308 and 310 of FIG. 3 can also be easily controlled to vary the output voltage $V_{out}$ of FIG. 1. How to control these gates is well known in the literature and will not be discussed here. However, there is needed in the industry a way to (1) return to the use of testable modular DC-DC power converters while (2) reducing the associated power delivery parasitic inductance and (3) reducing the associated feedback signal parasitic inductance. Finally, it is highly desirable having a simple way to introduce a transformer into the DC-DC converter, to allow use of higher input voltages.

Exemplary embodiments herein address some or all of these concerns. Briefly, in an exemplary embodiment, a simple buck regulator or transformer based feed-forward converter, or any power supply based on a switching current through an output inductor, is repackaged in a 3D fashion such that the voltage inputs, all ground connections, and control signals are passed through a vertical card edge, but the high current contact of the output inductor is directly soldered, independent of the card edge. In another exemplary embodiment, the analog to digital converter sense components are moved from the power supply card to near the load. These sense components produce a voltage $V_{sense}$ which functions as a current sense signal used to control the power supply, and removing the associated parasitic inductance from the control loop improves power supply voltage tracking and current balance.

Figure 4:
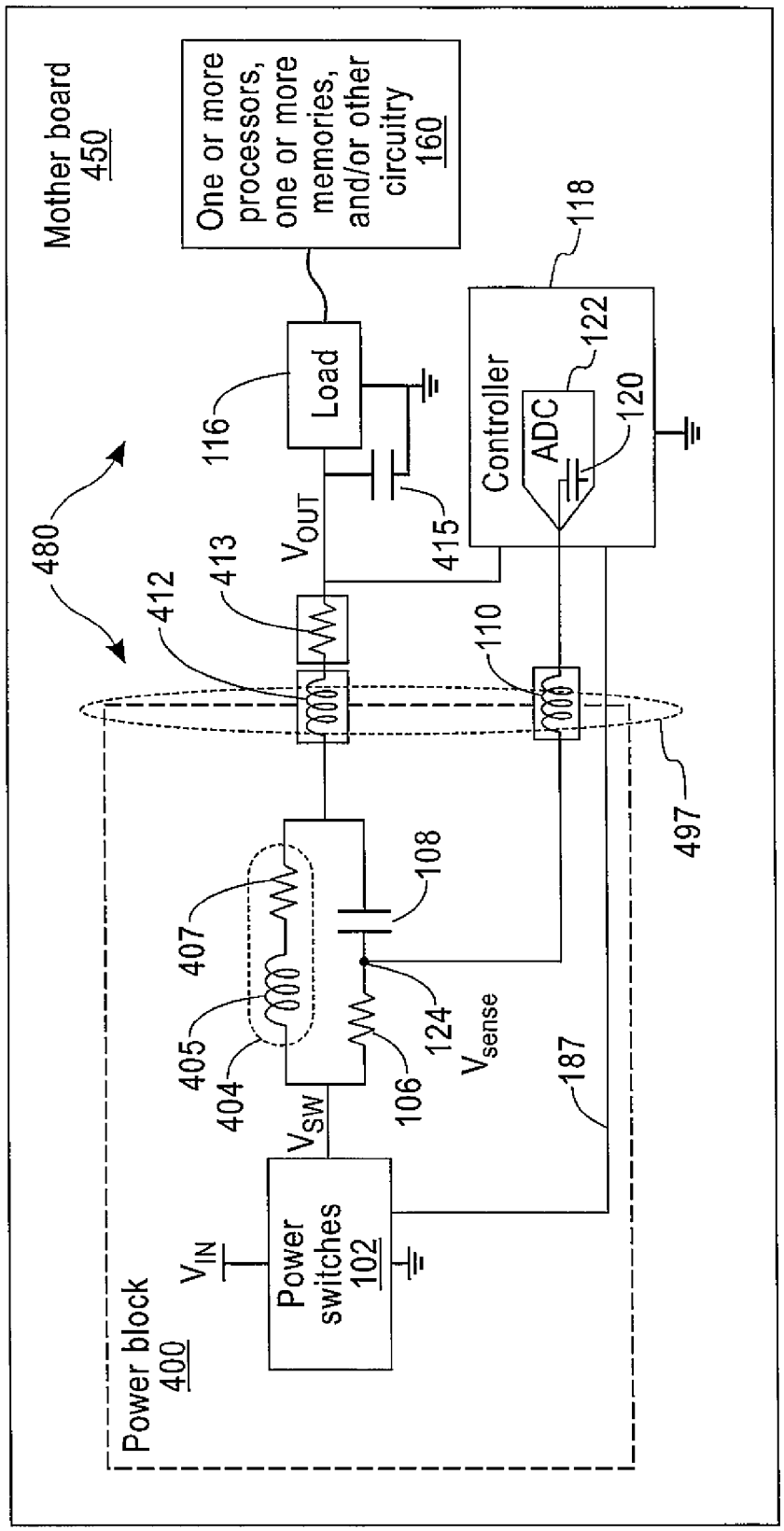

In more detail, one exemplary concept is to repackage the DC-DC converter of FIG. 1, in such a way that the output capacitance is on the system planar (the mother board 150 in this case) but the output inductance is on the discrete DC-DC converter, which we call a power block. By doing this, that substantial portion of the loop inductance 112 of the power delivery system associated with the power supply connector becomes part of the required power supply inductance 105. The combined inductance is shown in FIG. 4 as inductor 404, along with its associated resistance 407 and inductance 405. As we will show, the power block assembly 400 can be mounted such that its circuit board is at right angles to the system planar (in this example, the mother board 450), which allows the power supplies to be packed more closely together than if all components are direct soldered to the system planar, which reduces the remaining loop inductance. The inductor 404 may have its own dedicated contact to the system planar in an exemplary embodiment (see, e.g., FIG. 5). Also as will be shown, the sense voltage parasitic inductance is also repositioned and reduced, providing improved power supply voltage stability.

It is noted that in the figures and for ease of reference, like components are given like reference numbers. For instance, the load 116 in FIGS. 4 and 1 (and all other figures where this load is used) is used to represent any number of different possible loads, as represented by a single block 160.

One exemplary concept is shown schematically in FIG. 4. In principle this concept applies equally well to the power switches of FIG. 1 or FIG. 2, but one embodiment is to use for the power switches 402 the feed forward converter of FIG. 3, as the transformer provides the ability to use a larger intermediate voltage, for example 48V, and thus to have higher efficiency AC-DC converters and lower intermediate voltage distribution losses (i.e., the product of the supply current $I^2$ times the resistance R of the conductor from the AC-DC output to the DC-DC input, alternatively called $I^2R$ loss or conduction loss), owing to the four-times smaller output currents as compared to 12V AC-DC converters.

In FIG. 4, the power block 400 includes power switches 102 (which may be the power switches shown in FIGS. 2 or 3 in exemplary embodiments), connected between $V_{in}$ and ground, and producing $V_{sw}$. The parasitic inductance (L) 412 and resistance 413 are shown, and the required inductor is indicated by 404 (with inductance 405 and internal resistance 407). The inductor 404 may be the same as inductor 104 or may be of a different design (e.g., as illustrated by FIG. 8). The inductor 404 is termed an output inductor, since the inductor 404 products the output voltage $V_{out}$. The same construction will be used herein with other inductors that produce $V_{out}$. The mother board 450 includes the parasitic inductance 412 and parasitic resistance 413 and one or more capacitor(s) 415 (represented by a single capacitor shown). The small swing sense signal, proportion to the power supply current and on average equal to the output voltage $V_{out}$, is shown as a voltage, $V_{sense}$ 124. In this example, the capacitor 114 has been moved off the power block and is now on the mother board 450. The capacitor 415 illustrates both the capacitor 114 and the capacitor 115. A voltage converter 480, which performs DC-DC conversion, comprises power switches 102, inductor 404, resistor 106, capacitor 108, and a portion of capacitor 415 that is attributable to the capacitor 114.

In more detail, comparing FIGS. 1 and 4, the large output capacitor(s) 114 are removed from within the dotted box (100), indicating that they will be moved to the system planar (the mother board 450 in this example) containing the load 414. This is a simplification of the circuit. Furthermore, in this example, the power block 400 is configured such that ground and output voltage contacts between the circuit board for the power block 400 and the mother board 400 are made through soldered or connectorized board-to-board interfaces (illustrated by reference 497). A soldered board-to-board interface is a connection made between two boards using solder. A connectorized board-to-board interface is one using a connection, such as a wired connection, and not using a soldered board-to-board interface. The output capacitance 415 for the voltage converter is located on the mother board 450 with no board-to-board output voltage interface between the voltage converter output capacitance 415 and the load 116. This causes the inductance 412 of the board-to-board output voltage interface to function as part of the voltage converter output inductor's inductance 405 and not as a parasitic inductance between the voltage converter output capacitor and the load. The resistance 413 of the board-to-board output voltage interface is still present, but removal of parasitic inductance 412 is an improvement over FIG. 1.

Figure 5:
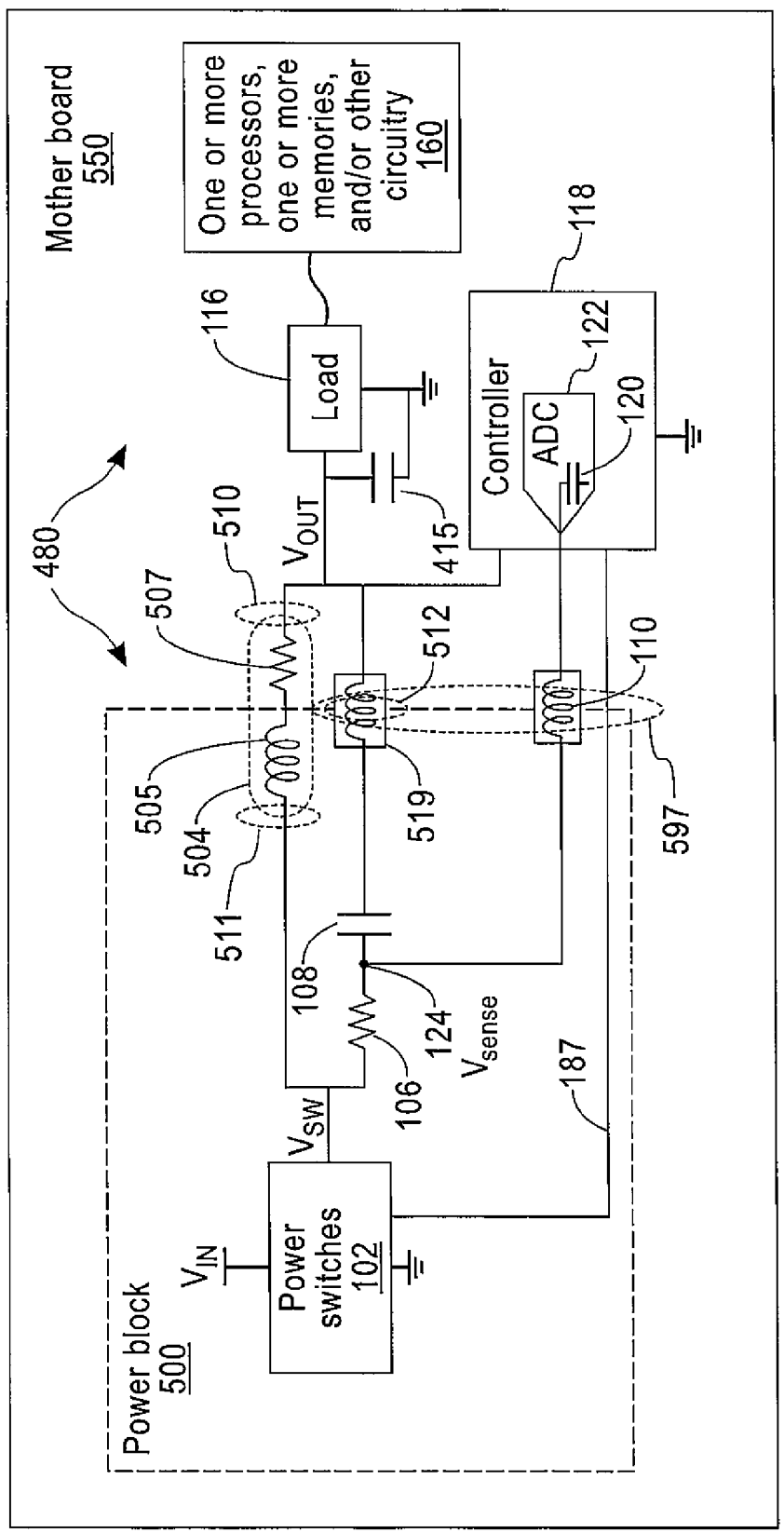

FIG. 5 is another example of a schematic of an exemplary power block packaging concept. In FIG. 5, a first terminal 510 of the output inductor 504 contacts the mother board 550 and a second terminal 511 of the output inductor 504 contacts the power block (which is a circuit board in this example). See also FIGS. 8, 9A, 9B and 10. The first terminal 510 is an output inductor contact to the mother board 550, bypassing the board-to-board interface. The first terminal 510 therefor connects the output inductor 504 to the mother board 550 through a path separate from a board-to-board interface 597 used by the ground and other electrical signals comprising control and input voltage. In this example, the interfaces 519 and 110 are board-to-board interfaces 597. This scenario removes the electrical resistance 413 of the board-to-board connection from the power line (e.g., output of the inductor) and reduces cost and mechanical bulk of the board-to-board interface. Additional details about FIG. 5 are described with respect to FIG. 7.

Figure 6:
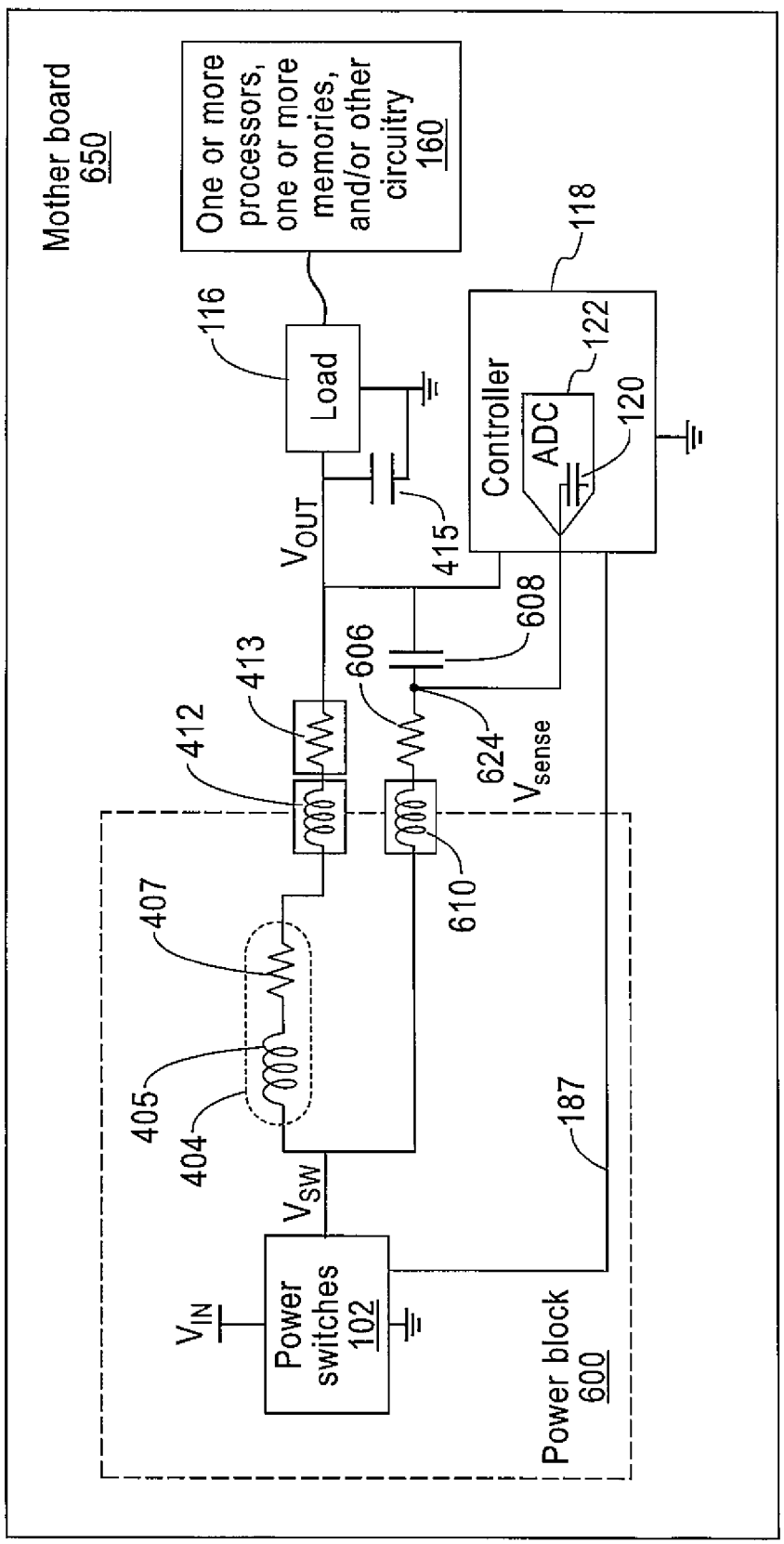

Referring to FIG. 6, this figure is another schematic of another exemplary power block packaging concept. In this example, the components used for sensing the current produced through or voltage produced across the output inductor 404 are on the mother board 650 near the load 116 and not on the power block 600, and no components are on the power block 600 that are used for sensing the current through or voltage across the output inductor 404. The term "near" is used in an electrical sense, in that the components are close enough to the load 116 to minimize electrical parasitics such as inductance and resistance. This configuration reduces the current through a sense line from these sense components and a measurement circuit on the first circuit board, thereby reducing the electrical effect of this sense line's parasitic inductive connection (illustrated by 610) between the mother board 650 and the power block 600 (e.g., relative to the effect in FIG. 4, where the components are on the power block 400). In this case, the components used for sensing are the resistor 606 and the capacitor 608. It is noted that the sense resistor 606 may be located either on the mother board 650 or the power block 600, as the location of the sense resistor 606 does not change the RL impedance of this portion of the circuit and much of the benefit for this example comes from moving the inductance 110 from where it was in FIG. 1 to the left of the capacitor 108 (where the inductance is now shown as 610). Additional details about FIG. 6 are described with respect to FIG. 7.

Figure 7:
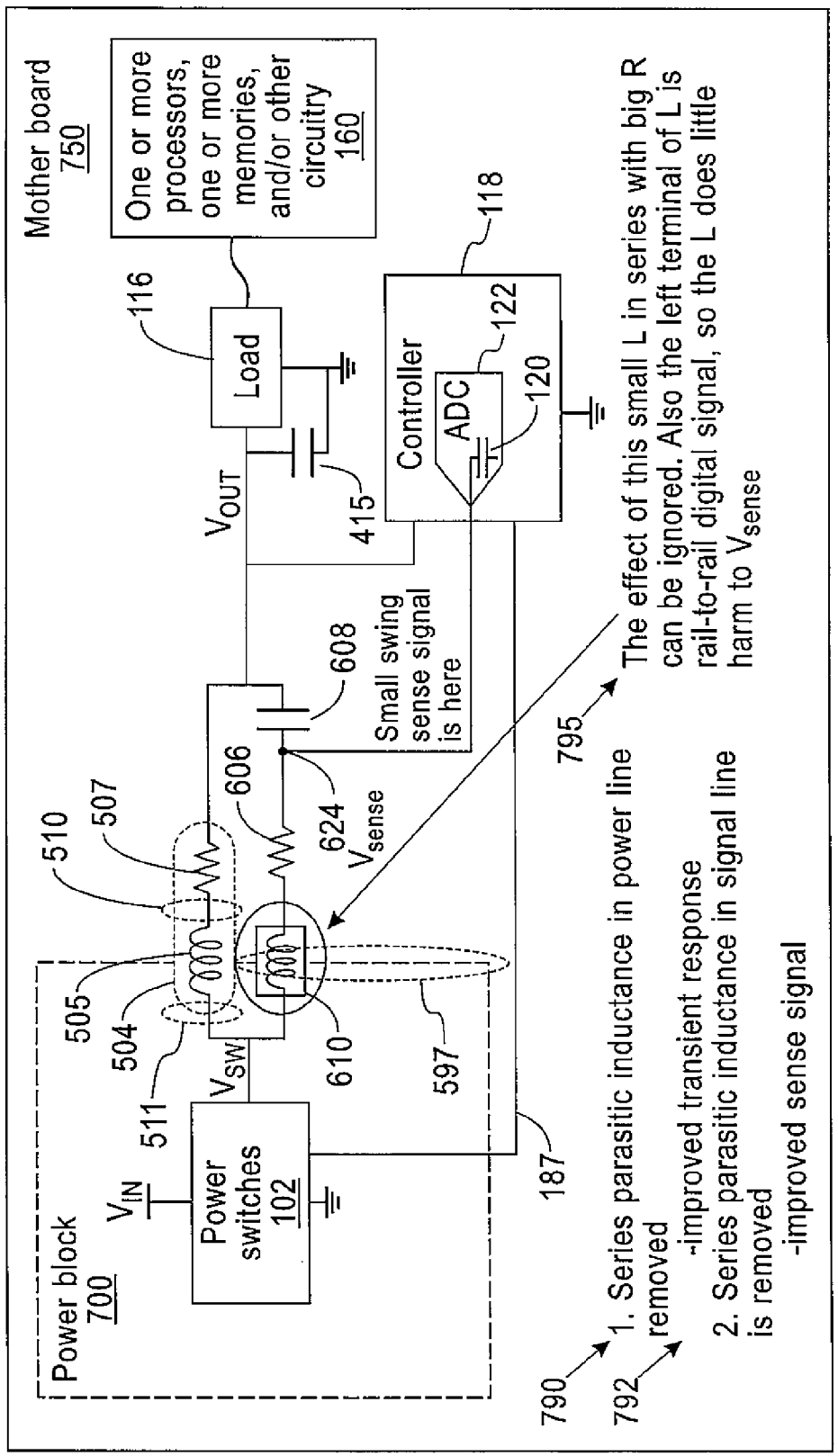

Referring to FIG. 7, this figure combines the configurations of FIGS. 5 and 6. The effect of the small L of parasitic inductance L 610 in series with the resistor R 606 (having a large value such as many kilo-Ohms) on the large signal swing $V_{SW}$ can be ignored (see reference 795). Also, the left terminal of the parasitic inductance L 610 is a rail-to-rail digital signal, so the parasitic inductance L 610 does little harm to $V_{sense}$ (see reference 795). Reference 790 indicates that, relative to FIG. 1, the series parasitic inductance in the power line of FIG. 4 is removed, which results in an improved transient response. Furthermore, as indicated by reference 792, the series parasitic inductance (see reference 112 of FIG. 1) in the signal line is substantially reduced and thus removed (compare FIGS. 1 and 7), which reduces degradation of the sense signal illustrated in part by $V_{sense}$. The inductor 504, resistor 606 and capacitor 608 form an RLC circuit, and an inner loop used, e.g., for current measurement (which can be used for very fast adjustment of signal 187 in certain controller schemes) includes the resistor 606 and capacitor 608 (now on the mother board 750 instead of being on the power block 100, as compared with FIG. 1).

The simplifications illustrated above allow one to put the components within the dotted box 700 (or 400, 500, or 600) onto a circuit card, as shown in FIG. 8. Referring now to FIG. 8, a power block 800 (an implementation of the power block 700 of FIG. 7 in this example) includes the circuit card 802, which contains the feed forward power switch components of FIG. 3.

In FIG. 8, a circuit board 802 has a front side (or surface) 890, a "left" side (in the orientation of FIG. 8) 893, a "right" side 894, a "top" side 895, a "bottom" side 896, and a back side 891. The bottom side 896 would be attached to the mother board 750, and the bottom side 896 has an edge 816. The perspective for FIG. 8 is a view toward the front surface 890, where the back side 891 is hidden. However, the circuit board 802 is shown in a translucent format, so that a copper shape 806 is on top of the front surface 890, while the copper shape 805 is on the back side 891. A transformer ferrite 804 is also on the front surface 890, and a transformer ferrite 803 is on the back side 891. If one were to take a vertical slice through the transformer ferrite 804 and the rest of the elements, the slice would pass through the transformer ferrite 804, then the copper shape 806, then the circuit board 802, then the copper shape 805 and finally through the transformer ferrite 803. There are the following connections on the bottom side 896 (from left to right): Vin, NC, G, Vcc, Drv, G, IsenP, G, G, G, G, G, G, and G. These will be soldered connectorized board-to-board interfaces (e.g., see FIGS. 9A and 9B). In this example, castellations 818 are shown. A castellation is a castellated hole. Note that only the Drv, G and IsenP castellations 818 are indicated by reference 818, but the other connections also have castellations in this example. These castellations 818 may be used to connect the circuit board 802 to the mother board 750. For instance, the surface mount contacts are designed to allow reflow soldering, with the result that the half (e.g., one-half) barrels (also called castellations 818) of FIG. 8 are filled with solder and a well-engineered solder fillet has formed on either side of the vertical power block edge, to copper pads (not shown in FIG. 8) of the mother board.

We will first explain how the transformer is implemented. The primary winding transformer 300 of FIG. 3 is realized as loops of wiring trace in the internal or external circuit board layers 897. The single turn secondary of the transformer is also embedded into the internal circuit boarder layers, along with the top and bottom layers. For an exemplary embodiment designed for operation from 12V, we use a circuit card of 12 internal metal layers, each layer of copper metal approximately 0.2.8 thousands of an inch thick (i.e., so-called 2 ounce copper, or 2*1.4 thousandths of an inch, where the amount of copper is rolled out into one square foot), with the top and bottom layers forming a total of 14 wiring layers. It should be obvious to one skilled in the art that using 1 oz, 2 oz, or even 4 oz copper here does not substantially affect the invention being discussed. The layers are assigned as illustrated by references 897 (the circuit board layers) and 898 (the function of the corresponding circuit board layer 897) in this exemplary embodiment.

The primary winding has three turns while the secondary has one turn, in an exemplary embodiment. This means the voltages on the secondary switching FETs are three times lower, or of order 4V, than the 12 volts impressed onto the primary switching FETs. Interdigitating the three primary windings (primary turns A, B and C) with the one turn secondary winding spreads the common flux over as large an area as possible, which reduces the deleterious effects of flux crowding. The 3:1 turns ratio we have found to be ideal for conversion from 12V to a range between 0.5-1.5V. A lower turns ratio does not give enough reduction in input current at 12V, while a higher turns ratio creates more resistance in the primary winding which is not offset by the lower currents in the primary winding—the power loss R*I*I is higher for 4:1, 5:1, etc. turns ratio, than it is for 3:1.

For 48V operation, one could use a 12:1 turns ratio, with a 12 turn primary and a single turn secondary. In this case, there are two turns of wire on each of layers 2, 4, 6, 9, 11, and 13, and the primary winding remains as it was for the 12V case. In our studies, the square of the primary resistance increases by more than the four times that the primary current will decrease at when running from 48V as opposed to 12V, but there is a compensating reduction in power lost through the primary FETs, and some minor changes in flux loss, such that the efficiency of the DC-DC converter is essentially unchanged from 12V to 48V. However, as an AC to 48V DC converter is typically more efficient than a comparable AC to 12V DC converter (owing to the four time smaller output currents at 48V), the move to 48V should result in overall higher efficiency.

The relatively heavy two ounce copper is not required on the outer circuit board layers owing to another innovation. Instead, a secondary transformer winding which must carry up to the full design capacity of 60 A is augmented with two copper shapes, 806 on the front and 805 on the back of the circuit board 802 of FIG. 8. These copper shapes are simply placed and soldered to the circuit card 802 at the same time as the other top and bottom surface components are assembled and reflowed. Finally, the transformer 300 of FIG. 3 is completed with the addition of a two-piece ferrite core. Ferrite 803 is placed on the back side 891 of circuit board 802 after copper shape 805 has been placed on the back side 891. A small amount of heat tolerant adhesive between 803 and 805 can allow both components to be placed prior to backside solder reflow, and keeps 803 attached as board 802 is flipped over for topside component assembly. Similarly, ferrite 804 can be placed on the front side 890 after formed copper 806 has been placed on the front side 890. There could be a small gap 814 between the two ferrites, with a controlled separation formed, as is standard industry practice, by having beads of a designed diameter immersed in the bonding adhesive which is ideally cured and set as part of the IR reflow process. The ER-shaped ferrite 804 has a leg 885 and the ER-shaped ferrite 803 has a leg 886, each of legs 885, 886 having a portion that fits into a notch 881 in the circuit card 802. The ER-shaped ferrite 804 has another leg 887 and the ER-shaped ferrite 803 has another leg 888, each of legs 887, 888 having a portion that fits into an opening 882 in the circuit card 802. Each ER-shaped ferrite 804, 803 has a third leg, which is illustrated by reference 888 and a dashed line in a circular shape. That third leg 888 extends from a bottom surface of the ER-shaped ferrite 804 toward the formed copper 806. Note that ER-shaped ferrites are only one possibility and other shapes could be used, such as U-shaped ferrites.

The output MOSFETs of FIG. 3 are shown in FIG. 8 as well. MOSFET 308 in FIG. 3 is backside device 808 of FIG. 8. Similarly MOSFET 310 in FIG. 3 is rendered as a pair of backside devices 810 of FIG. 8. The input MOSFETs 304 and 306 of FIG. 3, the gate drives for the FETs, and the like are not shown for convenience, but understood to be required to complete the design. The gate drive is a source of power supply loss, as the capacitance of the gates must be charged and discharged. The energy loss per charge-discharge cycle is $C*V^2$ where C is the capacitance of the gate and V is the gate voltage swing. For a power converter operating at frequency f, this results in a power loss $P=C*V*V*f$.

The number of FETs used for pulldown FET 308 or pullup FET 310 is a function of cost, available area, and the resultant power loss (both from the on-impedance of the FET while conducting, and the previously described gate switching loss $P=C*V*V*f$.) We have illustrated an exemplary embodiment but it should be understand that more or fewer FETs could be placed in parallel. Similarly a buck converter, or other switching FET topology, could have been used.

Of importance is that the topside secondary winding (the "C" portion of shape 806) is extended in a top portion as shown (in part) as extension 807 to form a single turn inductor, wrapped in a two piece inductor formed of ferrite pieces 811 and 812 with a gap 813. It is noted that ferrite piece 811 goes under and overlaps extension 807. The copper forming shape 807 also ends as the foot 821 in this example. It is quite important that the gap 813 be of a controlled size, as is standard industry practice. This could be accomplished by having beads of a designed diameter immersed in the bonding adhesive which is ideally, cured and set as part of the IR reflow process. Most of the magnetic energy of the inductor resides in this gap, and the size of the gap thus controls the value of the inductor.

As previously explained, for both the buck circuit of FIG. 2 and the feed forward circuit of FIG. 3, the current through the output inductor L created by the switching FETs is what generates the controllable output voltage L dI/dt. One major advantage here is that we can make the foot 820 of the inductor 821(a version of the inductor 504) contact the planar (via the front surface 890) directly—and so eliminating both the connector inductance part of 112 (see FIG. 1), as well as the soldered connection of both ends of the more commonplace discrete, surface mount inductor. In terms of FIG. 7, the internal resistance 507 is partly on the power block 700 and partly on the mother board 750. The foot 820 is one possible implementation of first terminal 510 of FIG. 5.

There is a drawback though, and that is that we are practically limited to a single turn inductor, as it would be complex to wind the conductor 807 around the ferrite. Since L is small, to make the voltage L dI/dt large, we need to make dI/dt large. As the change in current cannot be larger than zero to maximum, the only way to make dI/dt larger is to make dt smaller, i.e., operate at a higher frequency than, for example, would be used for the converter of FIG. 1. As a result, a modern buck converter operates around 100 KHz, while we propose to operate in the vicinity of 350 KHz. This means the power loss associated with switching the capacitance of the power FET, P=C*V*V*f, is of order 3.5 times higher, where C is the sum of all gate capacitances, V is the gate voltage swing (typically 3V to 5V for a 1V output converter) and f is the switching frequency.

As this is not the dominant source of inefficiency in modern converters, our design improvements gain more than they lose, and the net result is an improved power converter. We have termed the output inductor 820 of FIG. 8 the "kickstand", making an analogy to the mechanical component of the same name in a bicycle—typically a formed metal member which keeps the otherwise unstable bicycle upright while at rest. So too does our inductor allow the power block 800 (or 700) to be placed on edge, and to be soldered along card edge 816 to the circuit card 750 containing the load 116. We have computed the center of gravity of the power block 800 and the center of gravity is such that the block 800 is quite stable when placed on its card edge.

In an exemplary embodiment, we have carefully selected the signals on card edge 816 so as to minimize parasite inductances and resistances which can cause unwanted power losses or unexpected and undesirable voltage transients. Thus, for example, multiple ground (G) contacts are located adjacent of the power block power contact 721 which is carrying $V_{SW}$, thus minimizing the output loop inductance, or inductance between the output current and the ground return current. The current sense line (IsenP) is next (which corresponds to the line for resistor 606), shielded by ground and immediately adjacent its source. This makes the parasitic inductance 610 of FIG. 7 small.

Note that by moving inductance 610 to the left, or input side of the current sense point (actually a voltage sense point, Vsense 624), we have removed the inductor between $V_{sense}$ and the controller, and the system is much less susceptible to induced noise. That is, the problem of noise on the sense line caused by parasitic inductance has been substantially reduced. There is aground connection next, completing the isolation of $I_{sense}$ (note: $I_{sense}$ of FIG. 8 and $V_{sense}$ of FIG. 7 are the same thing—a signal associated with the fast feedback loop). Finally, we provide the same signals as must be in FIG. 1—a gate drive signal for the power FETs, a higher voltage $V_{cc}$ for the POWER FETs themselves and any sense logic, and the input voltage $V_{in}$. There is one reserve connection NC.

The power block 800 could be designed to plug into a conventional card edge connector, and indeed this is one way the module could be tested. Such a card edge connector could be similar to those used, e.g., for PCI. The connector would likely make contact with the edges of the ½ (one-half) barrel castellations 818. To make the contact area on the card larger, we could add small tabs to engage the connector; these tabs are connected to the edge of the ½ (one-half) barrel. There are at least two other ways to attach the kickstand power block 700 to the main planar 750. One way is to cut a slot in the main planar, sized to fit card edge 816. This is shown in FIG. 10. To form the slot, a series of vias 1004 are first patterned onto the receiving circuit card 1002. A slot 1010 is then cut into the circuit card, cutting through the vias and exposing the inner barrel. The slot 1010 is slightly larger than the power block card 802 so that the card 802 can be set into the slot of the card 1002. Note the pad 1006 for receiving the connector foot 820 of the inductor 821. Note that the output of the inductor 821 can go through one or more of the castellated vias 1004 and not through the connector foot 820. After the power block card edge 516 is placed into the slot, liquid solder is introduced from below to fill the open one-half barrel (a castellation) of via 1004 (shown as a half-barrel castellation) using, e.g., a common industry process known as wave or solder fountain soldering. So that a firm solder joint is made and to keep the power block vertical, the circuit card 802 of FIG. 8c could be extended below the vias/castellations 1004, with traditional card edge contacts. Finally, to control the depth of the card into the slot, with a 1 to 2 mm penetration of the power block card edge 816 below the bottom 1012 of the slot 1010, the extension should be somewhat less than full length of the card, so that the power block bottoms out onto the parent card 1002.

The extended region of the power block can also be used for system test, with the power block plugged into a standard card edge connector on a power supply test load card. The test card would contain the controller and output capacitor(s) 415 of FIG. 4.

Although the card slot attach method is very strong mechanically and affords excellent low resistance connections to the processor board's power planes, there are two drawbacks. The first is that the card slot necessarily cuts through all circuit board wiring planes, which could otherwise be constructively used for high speed or other required system planar interconnections. The second drawback is that two solder attach processes are required: a surface mount IR reflow or a hand solder of the inductor foot 820 to the top surface 590 of the mother board, and the aforementioned wave solder step.

For that reason, in another embodiment we have taken care to design so as to allow for automated surface mount assembly, automated test, and a rugged design for improved handling. The castellated card edge 816 of FIG. 8 presents the same structure to a single line of surface mount pads on the mother board top surface, as do the half (e.g., one-half) vias 1004 of FIG. 10 present to the aforementioned card edge pads of the power block (which would extend below the castellations 1004, and which could replace the castellations 818 as power block contacts).

These surface mount contacts are designed to allow a solder paste and IR reflow solder operation, with the result that the one-half barrels 818 of FIG. 8 are completely filled with solder and a well-engineered solder fillet has formed on either side of the vertical power block edge, to the copper pads of the mother board. This is shown in detail in FIGS. 9A and 9B, which are collectively referred to herein as FIG. 9. FIG. 9A is a side view, and FIG. 9B is a top view of power block surface features. Here, the power block card 902 is placed on the mother board 906 containing the load. Copper pads 908 receive the power block card edge castellations 818 of FIG. 8, while the inductor foot 820 of FIG. 8 contacts pad 910. That is, the pads 908 on the mother board 906 align with and are connected to the castellations 818 on the power block card 902. A solder fillet 904 forms on either side of the power block 902, after IR reflow of solder paste screen unto pads 908 and 910 prior to placement of the power block. Soldered connectorized board-to-board interfaces 997 are shown after soldering is performed.

There are additional engineering details that may be used to facilitate ease of assembly and to limit mechanical damage. Card 802 of FIG. 8 may be relieved at the top edge, so that the bonded ferrites 804+803 are inset somewhat from the card edge (e.g., via the notch 881). Further, the bond line 814 may be co-planar or slightly above the top surface of the circuit card 802, to facilitate application of the previously described gap-defining bonding adhesive. The bend 807 may be made to allow topside ferrite 811 to be placed first, beneath the inductor conductor. And bonding ferrite pair 811 and 812 may be inset from the right side card edge of 802. Finally ferrite 804 may be designed so the entire power block 800 can be lifted and placed onto the planar containing the load by a standard pick and place machines, e.g., by a vacuum pickup at the very top of the power block 800. The careful reader will observe that this point is not the center of gravity, but the moment arm is very small and the device is easily handled from this point.

It should be noted that wherever there is a single resistor, inductor, or capacitor shown, there could be multiple resistors, inductors, or capacitors, respectively, at those locations, as is known. The combination of features above is merely exemplary and the combination of features may change. For instance, not all features described in reference to FIG. 8 need be used for every implementation.

The following abbreviations that may be found in the specification and/or the drawing figures are defined as follows:

A amperes
AC alternating current
ADC analog to digital converter
DC direct current
FET field effect transistor
IR infrared
KHz kilo-Hertz
MOSFET metal oxide semiconductor field effect transistor
mV millivolts
NC not connected
oz ounce
PCI peripheral component interconnect
V voltage

What is claimed is:

1. An apparatus comprising:
a first circuit board comprising first components comprising a load; and
a power block comprising a second circuit board electrically connected to the first circuit board and comprising second components comprising switching power devices and an output inductor, said second circuit board lacking an output capacitance between said output inductor and a connection to said first circuit board, wherein the second circuit board is configured such that ground and output voltage contacts between the first and second circuit boards are made through soldered or connectorized board-to-board interfaces,
wherein certain first components on the first circuit board and certain second components, including the output inductor, on the second circuit board operate as a voltage converter that performs DC-DC voltage conversion for at least the load,
wherein an output capacitance for the voltage converter is located on the first circuit board with no board-to-board output voltage interface between the voltage converter output capacitance and the load, thereby causing the inductance of the board-to-board output voltage interface to function as part of the voltage converter output inductor's inductance and not as a parasitic inductance between the voltage converter output capacitor and the load.

2. The apparatus of claim 1, wherein the ground, control and input voltage contacts between the first and second circuit boards are made through a board edge of the second circuit board.

3. The apparatus of claim 1, wherein the second components comprise switching power devices that comprise a transformer.

4. The apparatus of claim 3, wherein at least some of the primary and secondary windings of the transformer are formed using layers of the second circuit board.

5. The apparatus of claim 3, wherein the transformer further comprises a first copper shape placed on top of a first side of the second circuit board and a second copper shape placed on a second side, opposite the first side, of the second circuit board.

6. An apparatus comprising:
a first circuit board comprising first components comprising a load; and
a power block comprising a second circuit board electrically connected to the first circuit board and comprising second components comprising switching power devices and an output inductor, wherein the second circuit board is configured such that ground and output voltage contacts between the first and second circuit boards are made through soldered or connectorized board-to-board interfaces,
wherein certain first components on the first circuit board and certain second components, including the output inductor, on the second circuit board operate as a voltage converter that performs DC-DC voltage conversion for at least the load,
wherein an output capacitance for the voltage converter is located on the first circuit board with no board-to-board output voltage interface between the voltage converter output capacitance and the load, thereby causing the inductance of the board-to-board output voltage interface to function as part of the voltage converter output inductor's inductance and not as a parasitic inductance between the voltage converter output capacitor and the load, and
wherein a first terminal of the output inductor contacts the first circuit board and a second terminal of the output inductor contacts the second circuit board, thereby connecting the output inductor to the first circuit board through a path separate from a board-to-board interface used by the ground and other electrical signals comprising control and input voltage, thereby removing the electrical resistance of the board-to-board connection from a power line that is an output of the inductor and reducing cost and mechanical bulk of the board-to-board interface.

7. The apparatus of claim 6, wherein the second components comprise switching power devices that comprise a transformer.

8. The apparatus of claim 7, wherein an input to the output inductor is directly connected to and formed of a same metal as a portion of a secondary winding of the transformer.

9. The apparatus of claim 6, wherein a connection between the first terminal of the output inductor and the first circuit board provides mechanical stability between the first and second circuit boards.

10. The apparatus of claim 7, wherein the switching power devices further comprise a plurality of transistors between an output of the transformer and ground.

11. The apparatus of claim 7, wherein the metal that is part of the output inductor and connected to the secondary winding is an extension and the extension forms a single turn portion of the output inductor, and wherein the output inductor further comprises two ferrite pieces that wrap the extension over an overlapping portion of the ferrite pieces, and wherein the two ferrite pieces are formed with a gap between the ferrite pieces.

12. The apparatus of claim 7, wherein at least some of the primary and secondary windings of the transformer are formed using layers of the second circuit board.

13. The apparatus of claim 7, wherein the transformer further comprises a first copper shape placed on top of a first side of the second circuit board and a second copper shape placed on a second side, opposite the first side, of the second circuit board, wherein the input to the output inductor is formed of a portion of the first copper shape.

14. The apparatus of claim 12, wherein the transformer further comprises a first ferrite having an ER shape placed over the first copper shape and over a portion of the first side of the second circuit board and comprises a second ferrite having an ER shape placed over the second copper shape and over a portion of the second side of the second circuit board, wherein legs of the ER-shaped ferrites are at least partially aligned and separated by a gap.

15. The apparatus of claim 14, wherein the board-to-board interface for ground and control signals is formed by an edge of the second circuit board, wherein one leg of each of the first and second ER-shaped ferrites passes through a notch in the second circuit board, the notch located at a second edge, opposite the first edge of the second circuit board, and another leg of each of the first and second ER-shaped ferrites passes through an opening in the second circuit board.

16. An apparatus comprising:
a first circuit board comprising first components comprising a load; and
a power block comprising a second circuit board electrically connected to the first circuit board and comprising second components comprising switching power devices and an output inductor, wherein the second circuit board is configured such that ground and output voltage contacts between the first and second circuit boards are made through soldered or connectorized board-to-board interfaces,
wherein certain first components on the first circuit board and certain second components, including the output inductor, on the second circuit board operate as a voltage converter that performs DC-DC voltage conversion for at least the load,
wherein an output capacitance for the voltage converter is located on the first circuit board with no board-to-board output voltage interface between the voltage converter output capacitance and the load, thereby causing the inductance of the board-to-board output voltage interface to function as part of the voltage converter output inductor's inductance and not as a parasitic inductance between the voltage converter output capacitor and the load,
wherein the ground, control and input voltage contacts between the first and second circuit boards are made through a board edge of the second circuit board, and
wherein the first circuit board comprises a line of surface mount pads on a top surface, wherein the second circuit board comprises board edge electrical contacts that are formed of board edge vias which have been cut through their barrels, forming a castellated surface, wherein the surface mount pads of the first circuit board align with and solder to the castellated vias of the second circuit board, thereby forming electrical and mechanical connections between the first and second circuit boards.

17. An apparatus comprising:
a first circuit board comprising first components comprising a load; and
a power block comprising a second circuit board electrically connected to the first circuit board and comprising second components comprising switching power devices and an output inductor, wherein the second circuit board is configured such that ground and output voltage contacts between the first and second circuit boards are made through soldered or connectorized board-to-board interfaces,
wherein certain first components on the first circuit board and certain second components, including the output inductor, on the second circuit board operate as a voltage converter that performs DC-DC voltage conversion for at least the load,
wherein an output capacitance for the voltage converter is located on the first circuit board with no board-to-board output voltage interface between the voltage converter output capacitance and the load, thereby causing the inductance of the board-to-board output voltage interface to function as part of the voltage converter output inductor's inductance and not as a parasitic inductance between the voltage converter output capacitor and the load, and
wherein the first circuit board comprises a slot and a board edge of the second circuit board extends into the slot, wherein the slot provides a plurality of castellations along two edges of the slot, adjacent to the board edge, and on each side of the second circuit board are board edge contacts that align with the castellations along the two edges, and wherein solder residing in the slot physically and electrically connects the first and second circuit boards together.

18. An apparatus comprising:
a first circuit board comprising first components comprising a load; and
a power block comprising a second circuit board electrically connected to the first circuit board and comprising second components comprising switching power devices and an output inductor, wherein the second circuit board is configured such that ground and output voltage contacts between the first and second circuit boards are made through soldered or connectorized board-to-board interfaces,
wherein certain first components on the first circuit board and certain second components, including the output inductor, on the second circuit board operate as a voltage converter that performs DC-DC voltage conversion for at least the load,
wherein an output capacitance for the voltage converter is located on the first circuit board with no board-to-board output voltage interface between the voltage converter output capacitance and the load, thereby causing the inductance of the board-to-board output voltage interface to function as part of the voltage converter output inductor's inductance and not as a parasitic inductance between the voltage converter output capacitor and the load, and wherein components used for sensing the current produced through or voltage produced across the output inductor are on the first circuit board near the load and not on the second circuit board, and no second components are used for sensing the current through or voltage across the output inductor, thereby reducing the current through a sense line from these sense components and a measurement circuit on the first circuit board, thereby reducing the electrical effect of this sense line's parasitic inductive connection between the second and the first circuit boards.

19. The apparatus of claim 18, wherein the sense components comprise a resistor and a capacitor in series, with this combination of sense components connected in parallel to the output inductor, an input of the resistor electrically connected to an output of the switching power devices, an output of the capacitor electrically connected to the load side of the output inductor, and a location used to sense the current or voltage is located between the resistor and capacitor.

20. The apparatus of claim 19, wherein the sense capacitor is located on the first circuit board but where the sense resistor can be located either on the first or second circuit board.

21. The apparatus of claim 18, wherein the load comprises one or more processors and wherein the first circuit board comprises a controller connected to the first components used for sensing the voltage and/or current and producing one or more control signals electrically connected to the switching power devices.

22. The apparatus of claim 18, wherein a first terminal of the output inductor contacts the first circuit board and a second terminal of the output inductor contacts the second circuit board, thereby connecting the output inductor to the first circuit board through a path separate from a board-to-board interface used by the ground and other electrical signals comprising control and input voltage and a signal used for sensing the current through or voltage across the output inductor, thereby removing the electrical resistance of the board-to-board connection from a power line that is an output of the inductor and reducing cost and mechanical bulk of the board-to-board interface.

* * * * *